United States Patent [19]

Hahn et al.

[11] 4,367,294

[45] Jan. 4, 1983

[54] PREPARATION OF POLYURETHANE FOAMS MODIFIED WITH MELAMINE-FORMALDEHYDE PRECONDENSATES

[75] Inventors: Klaus Hahn, Lampertheim; Peter Horn, Heidelberg; Matthias Marx, Bad Duerkheim; Heinz Weber, Gruenstadt; Wolfram Weiss, Mutterstadt; Rolf Wurmb, Heidelberg, all of Fed. Rep. of Germany

[73] Assignee: BASF Aktiengesellschaft, Fed. Rep. of Germany

[21] Appl. No.: 266,158

[22] Filed: May 22, 1981

[30] Foreign Application Priority Data

May 27, 1980 [DE] Fed. Rep. of Germany ....... 3020091

[51] Int. Cl.$^3$ .............................................. C08G 18/14
[52] U.S. Cl. ...................................... 521/158; 521/82; 521/136; 521/137; 528/85
[58] Field of Search .................. 521/136, 158, 137, 82

[56] References Cited

U.S. PATENT DOCUMENTS

| | | | |
|---|---|---|---|
| 3,135,707 | 6/1964 | Nyquist et al. | 260/2.5 |
| 3,523,093 | 8/1970 | Stamberger | 421/136 |
| 4,096,101 | 6/1978 | Blahak et al. | 521/136 |
| 4,122,049 | 10/1978 | Wagner | 521/136 |
| 4,130,697 | 12/1978 | Stern | 521/106 |
| 4,139,501 | 2/1979 | Rudner et al. | 521/136 |
| 4,160,075 | 7/1979 | Golser | 521/136 |
| 4,176,217 | 11/1979 | Golser et al. | 521/106 |
| 4,246,361 | 1/1981 | Yukuta et al. | 521/136 |
| 4,260,530 | 4/1981 | Reischl et al. | 521/136 |

*Primary Examiner*—Morton Foelak
*Attorney, Agent, or Firm*—Keil & Witherspoon

[57] ABSTRACT

A process for the preparation of polyurethane foams modified with melamine-formaldehyde precondensates, in which the precondensates employed are storage-stable, aqueous 40–85% strength by weight resin solutions which are obtained by condensing melamine with formaldehyde in a molar ratio of 1:1.1–1.75 in aqueous solution at a pH which, at least periodically, is above 8, and at from 60 to 130° C., until one part by volume of resin solution can be diluted with from 0.5 to 4 parts by volume of water at 20° C. without causing a persisting cloudiness.

10 Claims, No Drawings

PREPARATION OF POLYURETHANE FOAMS MODIFIED WITH MELAMINE-FORMALDEHYDE PRECONDENSATES

The present invention relates to a process for the preparation of polyurethane foams, especially of rigid polyurethane foams, by reacting organic polyisocyanates, polyols and melamine-formaldehyde precondensates, with or without chain extenders or crosslinking agents, in the presence of blowing agents and catalysts and in the presence or absence of auxiliaries and additives, wherein the melamine-formaldehyde precondensates used are storage-stable aqueous 40–85% strength by weight resin solutions which are obtained by condensing melamine with formaldehyde in a molar ratio of 1:1.1–1.75 in aqueous solution. The preparation of the polyurethane is preferably carried out by the two-component method.

The preparation of polyurethane foams from polyisocyanates and polyols, with or without chain extenders, auxiliaries and additives is disclosed in numerous patents and other literature publications, for example the monographs by J. H. Saunders and K. C. Frisch, High Polymers, volume XVI "Polyurethanes", parts I and II (Interscience Publishers, New York) and R. Vieweg and A. Höchtlen, Kunststoff-Handbuch, volume VII, Polyurethane, Carl Hanser Verlag, Munich.

Melamine-formaldehyde precondensates are usually prepared by condensing melamine with formaldehyde in various molar ratios in aqueous solution at a pH of above 7 and at an elevated temperature. The drop in the pH which occurs during the condensation and is caused by the Cannizzaro reaction of the formaldehyde is counterbalanced by continual addition of caustic alkalis; however, the condensation can also be carried out in the presence of suitable buffer systems. The condensation is continued until the desired degree of condensation is reached, and is then stopped by cooling, though it must be borne in mind that the reaction continues whilst cooling is in progress.

The dilutability of the resin solution with water is used as a measure of the degree of condensation, and is expressed as the amount of water which can be added to one part by volume of resin solution of conventional concentration (ie. 40–85% strength) at 20° C. without causing a persisting cloudiness.

Aqueous melamine-formaldehyde resin solutions whose condensation has been stopped have only a limited shelf life. When they are left to stand, or are stored, the condensation continues and the viscosity increases; finally, insoluble compounds separate out and the resin solutions become unusable for further processing. The shelf life or stability of a resin solution is specified in terms of the period, in days, over which any clouding which occurs does not lead to phase separation, and over which there is also no substantial change in the properties, for example the viscosity, of the solution. The shelf life is in most cases quoted for 20° C.

In contrast to urea-formaldehyde precondensate solutions, which can usually be stabilized efficiently, melamine-formaldehyde precondensate solutions stabilized by the conventional methods have only a short shelf life, the stability of the solution depending on the formaldehyde content, the degree of condensation and the pH.

To improve the shelf life, it has been proposed to etherify the melamine-formaldehyde precondensates completely or partially with low molecular weight alcohols, or to incorporate additives into the resin solutions. For example, the following additives have been disclosed: toluenesulfonamide in combination with alcohols (U.S. Pat. No. 3,159,593), sucrose (German Laid-Open Application No. DOS 1,420,605), sucrose in combination with toluenesulfonamide (German Laid-Open Application No. DOS 1,420,606), aliphatic nitro compounds (U.S. Pat. No. 3,131,157), dicyandiamide in the presence of alcohols and guanidinium salts (German Published Application No. DAS 1,144,006) and bis-($\beta$-cyanoethyl)-amine (German Laid-Open Application No. DOS 2,155,104). These agents in most cases have to be added in relatively large amounts so that the desired effect results, and have only been tried, or disclosed, for precondensate solutions in which the proportion of formaldehyde is high (ie. the melamine-formaldehyde molar ratio is 1:>2).

According to U.S. Pat. No. 4,139,501 and U.S. Pat. No. 3,135,707, partially etherified and completely etherified methylolmelamines are used as fire-retardant additives in the preparation of polyurethane foams. One of the disadvantages of the processes described is that the low molecular weight melamine derivatives can only be mixed with the polyols or the polyisocyanates immediately prior to processing.

U.S. Pat. Nos. 4,130,697 and 4,176,217 describe foams, having improved fire resistance, obtained from aqueous aminoplast precondensates, for example melamine-formaldehyde precondensates or, preferably urea-formaldehyde precondensates and urea-melamine-formaldehyde precondensates, and polyisocyanates, with or without polyols. The disadvantage of these processes is that the aminoplast precondensates must be added to the polyisocyanates simultaneously with, but separately from, the acid curing catalysts, ie. even using this method, more than two starting materials must simultaneously be mixed thoroughly.

Compared to conventional methods of preparation of polyurethane foams from polyisocyanates and polyols, the practical implementation of the processes described, with additional use of low molecular weight completely or partially etherified methylolmelamines or aminoplast precondensates, presents considerable problems. The usable aqueous melamine-formaldehyde precondensate solutions have a very limited shelf life, especially compared to that of urea-based aminoplast precondensates. The resin solutions, as well as any mixtures of polyol and aminoplast precondensates, must be freshly prepared immediately prior to the reaction with the polyisocyanates. Because of the high reactivity of such aminoplast precondensates, "acidic" catalysts required for the crosslinking cannot be incorporated beforehand into the resin solution, ie. expensive multi-component foaming machinery is in every case required for processing. Finally, the foams produced from such aminoplast precondensates emit a substantial amount of formaldehyde, so that for numerous applications they are unusable, and they furthermore show considerable shrinkage, especially if no polyol was used as an additional component during their preparation.

It is an object of the present invention to provide polyurethane foams, having good mechanical properties and improved fire resistance, by employing aqueous melamine-formaldehyde precondensate solutions. Specifically, the polyurethane foams are to be capable of preparation on conventional foaming machinery by the two-component process, preferably using carbon dioxide, generated from the polyisocyanates and water, as the blowing agent, and substantially without using the fluorohydrocarbons, which present ecological problems. In addition, the foams obtained should not emit any formaldehyde.

We have found that this object is achieved, surprisingly, by a process for the preparation of polyurethane foams by reacting organic polyisocyanates, polyols and melamine-formaldehyde precondensates in the presence of blowing agents and catalysts and in the presence or absence of chain extenders or crosslinking agents, auxiliaries and additives, wherein the melamine-formaldehyde precondensates used are aqueous resin solutions which have a melamine-formaldehyde precondensate content of 40–85% by weight, based on total weight, and which are obtained by condensing melamine with formaldehyde, in a molar ratio of 1:1.1–1.75, in aqueous solution.

We have found that aqueous 40–85% strength by weight melamine-formaldehyde precondensate solutions, which are obtained by condensing melamine and formaldehyde in a molar ratio of 1:1.1–1.75, have a relatively good shelf life. In particular, it is surprising that mixtures of 100 parts by weight of the aqueous melamine-formaldehyde precondensates used according to the invention and 1–50 parts by weight of polyol, with or without chain extenders or crosslinking agents, auxiliaries and additives, have, in the presence of basic polyurethane catalysts, especially tertiary amines, and "acidic" curing catalysts, a shelf life of 1 week or more at room temperature, provided the pH of the mixture is above 7. The polyurethane foams, modified with melamine-formaldehyde precondensates, can therefore be prepared advantageously by the preferred two-component process. Examples of further advantages are that the aqueous melamine-formaldehyde precondensate solutions can be very concentrated, ie. the solutions are still readily pourable even at a solids content of 85% by weight, that carbon dioxide, generated from water and polyisocyanate, is the preferred blowing agent, and that the polyurethane foams obtained have good fire resistance and emit virtually no formaldehyde.

Preferably, rigid polyurethane foams are prepared by the process according to the invention. However, semi-rigid and soft, resilient polyurethane foams can also be obtained.

The following may be noted in respect of the starting components which can be used for the process according to the invention:

Examples of organic polyisocyanates which can be used are aliphatic, cycloaliphatic, araliphatic, heterocyclic and, preferably, aromatic polyfunctional isocyanates. Specific examples are aliphatic diisocyanates, eg. ethylene diisocyanate, 1,4-tetramethylene diisocyanate, 1,6-hexamethylene diisocyanate and 1,12-dodecanediisocyanate; cycloaliphatic diisocyanates, eg. cyclohexane 1,3-diisocyanate and 1,4-diisocyanate, and any mixture of these isomers, 1-isocyanato-3,3,5-trimethyl-5-isocyanatomethyl-cyclohexane, 2,4- and 2,6-hexahydrotoluylene diisocyanate and any mixture of these isomers, and 4,4'- and 2,4'-diisocyanato-dicyclohexylmethane; aromatic diisocyanates, eg. 1,3- and 1,4-phenylene diisocyanate, 2,4- and 2,6-toluylene diisocyanate and any mixture of these isomers, 2,2'-, 2,4'- and 4,4'-diphenylmethane diisocyanate and naphthalene 1,5-diisocyanate; aromatic polyisocyanates, eg. 4,4',4''-triphenylmethane triisocyanate, 2,4,6-triisocyanatobenzene and polyphenyl-polymethylene polyisocyanates. It is also possible to use modified polyisocyanates, for example those described in U.S. Pat. No. 3,492,330, polyisocyanates containing carbodiimide groups (German Pat. No. 1,092,007), polyisocyanates containing allophanate groups (British Pat. No. 994,890 and Belgian Pat. No. 761,626), polyisocyanates containing isocyanurate groups (German Pat. Nos. 1,022,789, 1,222,067 and 1,027,394, and German Laid-Open Applications Nos. DOS 1,929,034 and DOS 2,004,048), polyisocyanates containing urethane groups (Belgian Pat. No. 752,261 and U.S. Pat. No. 3,394,164), polyisocyanates containing biuret groups (German Pat. No. 1,101,394 and British Pat. No. 889,050) and polyisocyanates containing ester groups (British Pat. Nos. 965,474 and 1,072,956, U.S. Pat. No. 3,567,763 and German Pat. No. 1,231,688).

Preferred compounds are the industrially readily obtainable aromatic diisocyanates and polyisocyanates, such as 2,4- and 2,6-toluylene diisocyanate and any mixture of these isomers, 2,2'-, 2,4'- and 4,4'-diphenylmethane diisocyanate and any mixture of these isomers, mixtures of 2,2'-, 2,4'- and 4,4'-diphenylmethane diisocyanates and polyphenyl-polymethylene polyisocyanates (crude MDI), mixtures of toluylene diisocyanates and crude MDI, and polyisocyanates containing urethane and isocyanurate groups. The diisocyanates and polyisocyanates mentioned can be employed individually or as mixtures.

The polyols used in the process according to the invention are preferably conventional linear and/or branched polyester-ols and especially polyether-ols, having molecular weights of from 200 to 8,000, preferably from 800 to 5,000, and especially from 1,800 to 3,500. However, other hydroxyl-containing polymers having the said molecular weights, for example polyesteramides, polyacetals and polycarbonates, especially those prepared by trans-esterification from diphenyl carbonate and hexane-1,6-diol, can also be used.

The polyester-ols can be prepared, for example, from dicarboxylic acids, preferably aliphatic dicarboxylic acids, having an alkylene radical of 2 to 12, preferably 4 to 8, carbon atoms, and polyhydric alcohols, preferably diols. Examples are aliphatic dicarboxylic acids, eg. glutaric acid, pimelic acid, suberic acid, azelaic acid, sebacic acid, undecanedicarboxylic acid, dodecanedicarboxylic acid and, preferably, succinic acid and adipic acid, and aromatic dicarboxylic acids, such as phthalic acid and terephthalic acid. Examples of dihydric and polyhydric, especially dihydric and trihydric, alcohols are ethylene glycol, diethylene glycol, 1,2- and 1,3-propylene glycol, dipropylene glycol, decane-1,10-diol, glycerol, trimethylolpropane and, preferably, butane-1,4-diol and hexane-1,6-diol.

The polyester-ols have molecular weights of from 300 to 2,800, preferably from 300 to 2,000, and hydroxyl numbers of from 30 to 700, preferably from 50 to 500.

However, the preferred polyols are polyether-ols, which are prepared by conventional processes from one or more alkylene oxides of 2 to 4 carbon atoms and a starter molecule which contains from 2 to 8, preferably from 2 to 4, active hydrogen atoms.

Examples of suitable alkylene oxides are tetrahydrofuran, 1,3-propylene oxide, 1,2- and 2,3-butylene oxide, styrene oxide and, preferably, ethylene oxide and 1,2-propylene oxide. The alkylene oxides can be used individually, or in alternation, or as mixtures. Examples of suitable starter molecules are: water, organic dicarboxylic acids, eg. succinic acid, adipic acid, phthalic acid and terephthalic acid, aliphatic and aromatic unsubstituted or N-monoalkyl-, N,N-dialkyl- and N,N'-dialkyl-substituted diamines, where alkyl is of 1 to 4 carbon atoms, eg. unsubstituted, monoalkyl-substituted and dialkyl-substituted ethylenediamine, diethylenetriamine, triethylenetetramine, propylene-1,3-diamine, butylene-1,3- and -1,4-diamine, hexamethylene-1,2-, -1,3-, -1,4-, -1,5- and -1,6-diamine, phenylenediamines, toluylene-2,4- and -2,6-diamine and 4,4'-, 2,4'- and 2,2'-diamino-diphenylmethane; monoamines, eg. methylamine, ethylamine, isopropylamine, butylamine, benzylamine, aniline, the toluidines and the naphthylamines. Amongst the above, compounds of particular interest are N,N,N',N'-tetrakis-(2-hydroxyethyl)-ethylenediamine, N,N,N',N'-tetrakis-(2-hydroxypropyl)-ethylenediamine, N,N,N',N'',N''-pentakis-(2-hydroxypropyl)-ethylenetriamine, phenyldiisopropanolamine and higher alkylene oxide adducts of aniline.

Further suitable starter molecules include alkanolamines, eg. ethanolamine, diethanolamine, N-methyl-diethanolamine, N-ethyl-diethanolamine, N-methyl-dipropanolamine, N-ethyl-dipropanolamine and triethanolamine, hydrazine and hydrazides. Preferred starter molecules are polyhydric, especially dihydric and/or trihydric, alcohols, eg. ethylene glycol, 1,2-propylene glycol, 1,3-propylene glycol, diethylene glycol, dipropylene glycol, 1,4-butylene glycol, 1,6-hexamethylene glycol, glycerol, trimethylolpropane and pentaerythritol.

Other useful polyols are the non-reducing sugars, the non-reducing sugar derivatives and, preferably, their adducts with alkylene oxides of 2 to 4 carbon atoms. Examples of useful non-reducing sugars and sugar derivatives are sucrose, alkylglycosides, eg. methylglycoside and ethyleneglycoside, and glycol-glycosides, eg. ethylene glycol-glycoside, propylene glycol-glycoside, glycerol glycoside and 1,2,6-hexanetriol glycoside.

Examples of the polyester-amides are the predominantly linear condensates obtained from polybasic saturated and/or unsaturated carboxylic acids or their anhydrides and polyhydric saturated and/or unsaturated aminoalcohols, or mixtures of polyhydric alcohols and aminoalcohols and polyamines.

Examples of suitable polyacetals are the compounds obtainable from glycols, eg. diethylene glycol, triethylene glycol, 4,4'dihydroxyethoxy-diphenyl-dimethylmethane or hexanediol, and formaldehyde. Polyacetals suitable for the purposes of the invention can also be prepared by polymerizing cyclic acetals.

Suitable hydroxyl-containing polycarbonates are of a conventional type, for example those obtainable by reacting diols, eg. propane-1,3-diol, butane-1,4-diol and/or hexane-1,6-diol, diethylene glycol, triethylene glycol or tetraethylene glycol, with diaryl carbonates, for example diphenyl carbonate, or with phosgene.

The polyols may be employed as single compounds or as mixtures. For example, mixtures of polyester-ols and polyether-ols have proved useful; in these, the ratio of the components can be varied within wide limits depending on the end use of the rigid polyurethane foam being prepared; for example, the weight ratio of polyester-ol to polyether-ol can be from 20:80 to 80:20.

An essential feature of the present invention is the presence, in the reaction, of aqueous melamine-formaldehyde precondensate solutions, which contain from 40 to 85% by weight, preferably from 50 to 70% by weight, based on total weight, of the precondensate and which are prepared by condensing melamine with formaldehyde, in a molar ratio of 1:1.1–1.75, preferably 1:1.4–1.70 and especially 1:1.5–1.65, in aqueous solution.

The condensation is carried out with commercial melamine and preferably aqueous 30–40% strength by weight formaldehyde solutions, which may or may not be stabilized.

As already explained, the condensation of the melamine-formaldehyde precondensates employed according to the invention is carried out in aqueous solution, at from 60° to 130° C. under atmospheric or superatmospheric pressure, preferably at from 80° to 100° C. under atmospheric pressure, and at least periodically at a pH above 8, preferably a pH of 8–12 and especially of 9–11 (measured at room temperature, and with temperature compensation), until a water-dilutability of 1:0.5–4 at 20° C. is reached. This water-dilutability means, for the purposes of the invention, that one part by volume of resin solution can be diluted with 0.5–4 parts by volume of water at 20° C. without producing a persisting cloudiness.

The requisite pH range can be obtained by using inorganic bases, for example aqueous sodium hydroxide solution or potassium hydroxide solution, and/or organic bases, for example tertiary amines, monoalkanolamines, dialkanolamines, trialkanolamines, N-alkylalkanolamines, N,N-dialkylalkanolamines, N-alkyldialkanolamines and the like. After completion of the condensation—which requires from about 15 to 400 minutes—the melamine-formaldehyde precondensate solution is cooled. The solution thus obtained has a shelf life of 30 days or more at room temperature and its viscosity at 20° C. is from 20 cp to 5,000 P, preferably from 30 cp to 3,000 P, and especially from 30 cp to 1,000 P, depending on the solids conent, so that the solution is still relatively easily processable on polyurethane foaming equipment.

To increase the shelf life, stabilizers, in amounts of at most 15% by weight, preferably from 0.1 to 3% by weight, based on the solids content of the melamine-formaldehyde precondensate solution, can be incorporated into the melamine-formaldehyde mixture before starting the condensation or the melamine-formaldehyde precondensate solution in the course of, or after completion of, the condensation. The conventional stabilizers may be used for this purpose, for example combinations of toluenesulfonamide with alcohols or sucrose, dicyandiamide in the presence of alcohol and guanidinium salt, lactam, caprolactam and thiourea.

The melamine-formaldehyde precondensate solutions obtained can be mixed with the other starting components, auxiliaries and additives, except for the polyisocyanates, either directly after the preparation of the solutions or only immediately before their conversion to polyurethanes. Advantageously, the melamine-formaldehyde precondensate solutions are mixed, directly after the condensation, with the catalyst, and, if appropriate, the polyols, chain extenders or cross-linking agents, inert physical blowing agents, auxiliaries and additives, and are stored as A-components. It can also be advantageous to carry out the condensation of melamine and formaldehyde in an aqueous medium in the presence of the polyols and of the appropriate catalyst for producing the foam.

Suitable mixtures for the preparation of the polyurethane contain 100 parts by weight of 40–85% strength by weight melamine-formaldehyde precondensate solutions and 1–50 parts by weight, preferably 8–20 parts by weight, of polyol. However, as already mentioned, storage-stable mixtures which contain basic polyurethane catalysts and may or may not contain acidic curing catalysts are only obtained if the mixtures have a pH of above 7, and preferably of 8–12.

It can under certain circumstances be advantageous to use chain extenders or crosslinking agents in addition to the polyols mentioned, when preparing the polyurethane foams. Examples of such additives are polyfunctional, in particular difunctional and trifunctional, compounds having molecular weights of from 17 to 600, preferably from 60 to 300. For example, dialkanolamines and trialkanolamines, eg. diethanolamine and triethanolamine, aliphatic and aromatic diamines, eg. ethylenediamine, butylene-1,4-diamine, hexamethylene-1,6-diamine, 4,4'-diamino-diphenylmethane, 3,3'-dialkyl-substituted 4,4'-diaminodiphenylmethanes, 2,4- and 2,6-toluylenediamine and, preferably, aliphatic diols and triols of 2 to 6 carbon atoms, eg. ethylene glycol, 1,4-butylene glycol, 1,6-hexamethylene glycol, glycerol and trimethylolpropane, may be used.

Where chain extenders and crosslinking agents are employed, the amounts used are from 1 to 60, preferably from 10 to 30, parts by weight per 100 parts by weight of polyol.

To accelerate the reaction between the polyols, water and, where present, chain extenders or crosslinking agents, on the one hand, and the organic polyisocyanates, on the other hand, conventional polyurethane catalysts are incorporated in amounts of 0.5 to 15 parts by weight, preferably 3 to 10 parts by weight, per 100 parts by weight of the aqueous melamine-formaldehyde precondensate solution, into the reaction mixture or, preferably, into the A-component. Basic polyurethane catalysts, for example tertiary amines, eg. dimethylbenzylamine, dicyclohexylmethylamine, dimethylcyclohexylamine, N,N,N',N'-tetramethyl-di-(aminoethyl) ether, bis-(dimethylaminopropyl)-urea, N-methylmorpholine, N-ethylmorpholine, dimethylpiperazine, pyridine, 1,2-dimethylimidazole, 1-azobicyclo- (3,3,0)-octane, dimethylaminoethanol, N,N',N''-tris-(dialkylaminoalkyl)-hexahydrotriazines, for instance N,N',N''-tris-(dimethylaminopropyl)-s-hexahydrotriazine, and especially triethylenediamine and triethanolamine, are preferred. However, metal salts, such as iron-II chloride, zinc chloride, lead octoate and, preferably, tin salts, eg. tin dioctoate, tin diethylhexanoate and dibutyl-tin dilaurate, are also suitable and are usually employed if the two-component process is not being utilized.

It has proved advantageous to use "acidic" curing catalysts additionally to the polyurethane catalysts in preparing the polyurethane foams, and accordingly this embodiment of the process is particularly preferred. Examples of acidic curing catalysts, which are employed in amounts of 0.5–5 parts by weight, preferably from 1 to 3 parts by weight, per 100 parts by weight of melamine-formaldehyde precondensate solution, are inorganic acids, eg. hydrochloric acid, sulfuric acid and especially phosphoric acid, organic carboxylic acids, eg. formic acid, oxalic acid and trifluoroacetic acid, sulfonic acids, eg. amidosulfonic acid and p-toluenesulfonic acid, Lewis acids, eg. boron trifluoride, phosphorus trichloride and phosphorus oxychloride, organic carboxylic acid chlorides, eg. benzoyl chloride, and latent curing agents, such as the salts of ammonia, of organic amines or magnesium with the above acids, as well as the esters of the acids. The blowing agent used is preferably water, a large excess of which is incorporated, with the aqueous melamine-formaldehyde precondensate solution, into the reaction mixture and in part reacts with the polyisocyanates to form carbon dioxide.

Physical blowing agents can also be employed, conjointly with the water. Suitable blowing agents of this type are liquids which are inert toward the organic polyisocyanates and have boiling points of below 100° C., preferably below 50° C., especially from −50° C. to 30° C., under atmospheric pressure, so that they vaporize under the influence of the exothermic polyaddition and polycondensation reaction. Examples of such preferred liquids are hydrocarbons, eg. pentane, n-butane, iso-butane and propane, ethers, eg. dimethyl ether and diethyl ether, ketones, eg. acetone and methyl ethyl ketone, ethyl acetate and especially halohydrocarbons, eg. methylene chloride or trichlorofluoromethane, dichlorodifluoromethane, dichloromonofluoromethane, dichlorotetrafluoroethane and 1,1,2-trichloro-1,2,2-trifluoroethane. Mixtures of these low-boiling liquids with one another and/or with other substituted or unsubstituted hydrocarbons can also be used.

The amount of physical blowing agent required in addition to water can easily be established as a function of the desired foam density and is from about 5 to 40 parts by weight, preferably from 10 to 30 parts by weight, per 100 parts by weight of melamine-formaldehyde precondensate solution. It can at times be advantageous to mix the organic polyisocyanate with the physical blowing agent and thereby to reduce the viscosity of the component.

Auxiliaries and various additives can also be incorporated into the reaction mixture. Examples include stabilizers, anti-hydrolysis agents, pore regulators, fungistatic and bacteriostatic substances, dyes, pigments, fillers, surfactants, plasticizers and flameproofing agents.

It is possible to use, for instance, surfactants which serve to assist the homogenization of the starting materials and may also be capable of regulating the cell structure of the foams. Specific examples are siloxaneoxyalkylene copolymers and other organopolysiloxanes, oxyethylated alkylphenols, oxyethylated fatty alcohols, paraffin oils, castor oil and ricinoleic acid esters and turkey red oil; these are employed in amounts of from 0.2 to 8, preferably from 0.5 to 5, parts by weight per 100 parts by weight of melamine-formaldehyde precondensate solution.

It can also be advantageous to incorporate a plasticizer into the reaction mixture, so that the brittleness tendency of the product is reduced. Conventional plasticizers can be used, but it is particularly advantageous to employ agents which contain phosphorus and/or halogen atoms and thereby additionally increase the fire resistance of the polyurethane plastics. Such agents include tricresyl phosphate, tris-2-chloroethyl phosphate, tris-chloropropyl phosphate and tris-2,3-dibromopropyl phosphate.

In addition to the melamine-formaldehyde condensates and halogen-substituted phosphates already mentioned, inorganic flameproofing agents, such as antimony trioxide, arsenic oxide, ammonium phosphate and calcium sulfate, may also be used for flameproofing the polyurethane foams.

In general, it has proved advantageous to use from 5 to 50 parts by weight, preferably from 5 to 25 parts by weight, of the said flameproofing agents per 100 parts by weight of melamine-formaldehyde precondensate solution.

The polyurethane foams can be prepared by the one-shot process. For this, the organic polyisocyanates and polyols, melamine-formaldehyde precondensates, water and, where relevant, chain extenders or crosslinking agents are reacted in the presence of the catalysts at from 5° to 40° C., preferably from 18° to 25° C., the amounts used being such that from 0.2 to 35, preferably from 0.5 to 15 and in particular about one, reactive hydrogen atom or atoms, bonded to OH, $NH_2$, NH, SH, COOH or $CONH_2$ groups of the polyols, melamine-formaldehyde precondensate or, where relevant, chain extenders or crosslinking agents, is or are present per NCO group, and that the ratio of equivalents of water to equivalents of NCO groups is from 135–0.9:1, preferably 20–5:1 and especially 15–5:1.

Where a mixing chamber with several feed nozzles is used, the starting materials, auxiliaries and additives can be introduced individually and mixed thoroughly in the chamber. Where a certain increase in viscosity, which may occur on mixing the melamine-formaldehyde precondensate solution with the polyols, does not adversely influence the processing, it has proved advantageous to employ the two-component process and to combine the polyols, aqueous melamine-formaldehyde precondensate solutions, polyurethane catalysts, acid curing catalysts and, where relevant, chain extenders or crosslinking agents, physical blowing agents, auxiliaries and additives, to form the A-component, and to employ, as the B-component, the organic polyisocyanates, mixed, where relevant, with physical blowing agents, auxiliaries and additives.

An advantageous aspect of this method is that transporting the materials as an A-component and B-component saves space and that these components can be stored for a limited time and merely require to be mixed thoroughly when preparing the polyurethane foams.

Polyurethane foam moldings produced by this embodiment of the process show little or virtually no shrinkage.

According to a further embodiment, the polyols are first completely or partially reacted with the polyisocyanates to give prepolymers containing isocyanate groups, and these prepolymers are then used as a B-component. In this case, it has proved advantageous to prepare prepolymers, containing isocyanate groups, from not less than 50% by weight, preferably from more than 90% by weight, of the amount of polyols to be employed. The remaining amounts of the polyols can either be mixed direct, in the mixing head, with the other starting components, auxiliaries and additives, or can, as described above, be combined with the aqueous melamine-formaldehyde precondensate solutions, polyurethane catalysts, acidic curing catalysts and, where relevant, chain extenders or crosslinking agents, physical blowing agents, auxiliaries and additives, to form the A-component.

The prepolymers containing isocyanate groups are prepared by conventional methods from the above polyols and from preferably aromatic polyisocyanates and have NCO contents of from 3 to 35, preferably from 12 to 28% by weight.

The polyurethane foams prepared by the process according to the invention have densities of from 10 to 300 kg/m$^3$, preferably from 30 to 50 kg/m$^3$, and are distinguished by low water absorption, low shrinkage, low heat conductivity and virtually no formaldehyde emission.

Products are preferably used as insulating materials.

In the Examples, parts are by weight.

PREPARATION OF THE AQUEOUS MELAMINE-FORMALDEHYDE PRECONDENSATE SOLUTIONS.

Examples 1a to 1c (1a) 2,388 g of 40% strength formaldehyde solution, 2,432 g of melamine and 1,942 g of water were mixed in a reaction vessel and 12.9 ml of potassium hydroxide solution (c=1.8 mole/l) and 12 ml of diethylethanolamine were added. The reaction mixture was then heated to 96° C., resulting in a solution. The condensation was continued for 140 minutes at 96° C. and the mixture was then cooled to 20° C.

The pH of the solution was 10.1, the formaldehyde:melamine molar ratio 1.65, the viscosity 35 cP/20° C., the solids content 50%, the water-dilutability 1:2 and the shelf life 35 days at 20° C.

(1b) To prepare 75% strength resin solution, 500 g of water were distilled under reduced pressure from 1,500 g of the solution described in Example 1a.

(1c) To prepare 80% strength resin solution, 600 g of water were distilled under reduced pressure from 1,600 g of the solution described in Example 1a.

(1d) To prepare 70% strength resin solution, 400 g of water were distilled under reduced pressure from 1,400 g of the solution described in Example 1a.

Example 2

Following a procedure similar to Example 1a, 2,388 g of 40% strength formaldehyde solution, 2,585 g of melamine, 2,095 g of water, 12.0 ml of potassium hydroxide solution (c=1.8 mole/l) and 10 ml of diethylethanolamine were mixed and condensed.

The pH of the solution was 10.1, the formaldehyde:melamine molar ratio 1.55, the viscosity 31 cP, the solids content 50.3%, the water-dilutability 1:2 and the shelf life 40 days at 20° C.

Resin solutions having higher solids contents were again obtainable by distilling off water under reduced pressure.

PREPARATION OF POLYURETHANE FOAMS

Examples 3 to 9

To prepare the polyurethane foams, the A-component and B-component, each at room temperature, were mixed thoroughly for 20 seconds, again at room temperature, and the mixture was allowed to foam in an open mold.

The starting materials and amounts used, and the measured start times, rise times, tack-free times, densities and fire-resistance are summarized in Table I.

In the Table, the molar ratio of formaldehyde:melamine has been abbreviated to F:M.

TABLE I

| Starting components | Examples | | | | | | |
|---|---|---|---|---|---|---|---|
| | 3 | 4 | 5 | 6 | 7 | 8 | 9 |
| A-component | | | | | | | |
| Melamine-formaldehyde precondensate solution according to | | | | | | | |
| Example 1b (F:M = 1.65; 75% strength) [g] | 100 | — | — | 100 | 100 | — | — |
| Example 1c (F:M = 1.65; 80% strength) [g] | — | — | 100 | — | — | — | — |
| Example 2 (F:M = 1.55; 50% strength) [g] | — | 100 | — | — | — | 100 | 100 |
| Polyether-ol based on glycerol, propylene oxide and ethylene oxide and having an OH-number of 35 [g] | 10 | 10 | — | — | 5 | 5 | 5 |
| Polyether-ol based on ethylenediamine and propylene oxide and having an OH-number of 480 [g] | — | — | — | 10 | 5 | 5 | — |
| Polyester-ol based on adipic acid, ethylene glycol and butane-1,4-diol and having an OH-number of 53–59 [g] | — | — | 10 | — | — | — | 5 |
| Triethanolamine [g] | 5 | 5 | 2 | 1 | 5 | 3 | 5 |
| Dibutyl-tin dilaurate [g] | 1 | — | — | — | 1 | 1 | 1 |
| Phosphoric acid (75% strength) [g] | 1 | 1 | — | — | — | 1 | — |
| Na $C_{15}$—paraffin sulfonate [g] | 3 | 3 | 3 | 3 | 3 | 3 | 3 |
| B-component | | | | | | | |
| Mixture of diphenylmethane diisocyanates and polyphenyl-polymethylene polyisocyanates (crude MDI) [g] | 40 | 40 | — | 40 | 40 | 40 | 40 |
| Mixture of 2,4- and 2,6-toluylene diisocyanates in the ratio 80:20 [g] | — | — | 20 | — | — | — | — |
| Start time [sec] | 40 | 52 | 30 | 40 | 35 | 60 | 50 |
| Rise time [sec] | 165 | 190 | 140 | 150 | 170 | 195 | 185 |
| Tack-free time [sec] | 165 | 190 | 140 | 160 | 180 | 200 | 190 |
| Density [kg/m$^3$] | 42 | 44 | 70 | 45 | 41 | 46 | 49 |
| Fire resistance according to DIN 4102 | B2 | B2 | B2 | B2 | B2 | B2 | B2 |
| Water absorption after 7 days [vol %] | 3 | 7 | 5 | 4 | 7 | 7 | 6 |
| Shrinkage after 7 days' storage at 20° C. [vol %] | 6 | 4.5 | 5.1 | 4.6 | 6.2 | 3.4 | 5.9 |
| Heat conductivity, measured at 10° C. [W/m °K.] | 0.039 | 0.037 | 0.036 | 0.039 | 0.040 | 0.038 | 0.036 |

Examples 10a–d

To prepare the prepolymers containing isocyanate groups, the organic polyisocyanates and polyols were mixed at room temperature, with stirring, and the polyaddition was then completed in 3.5 hours at 70° C.

The starting components and amounts used, and the NCO contents of the prepolymers obtained, are summarized in Table II.

TABLE II

| | Examples | | | |
|---|---|---|---|---|
| | 10a | 10b | 10c | 10d |
| Mixture of diphenylmethane diisocyanate and polyphenyl-polymethylene polyisocyanate [parts by weight] | 70 | 80 | — | 60 |
| Mixture of 2,4- and 2,6-toluylene diisocyanate in the ratio of 80:20 [parts by weight] | — | — | 40 | — |
| Polyether-ol based on glycerol, propylene oxide and ethylene oxide and having an OH-number of 35 [parts by weight] | 30 | 20 | 60 | 40 |
| NCO content of the prepolymer obtained (calculated) [parts by weight] | 21.0 | 24.3 | 14.4 | 17.6 |

Examples 11–14

The polyurethane foams were prepared by methods similar to that of Examples 3–9.

The starting components and amounts used, as well as the measured start time, rise time, tack-free time, density and fire resistance according to ASTM D 635-77 are summarized in Table III.

TABLE III

| | Examples | | | |
|---|---|---|---|---|
| | 11 | 12 | 13 | 14 |
| A-component | | | | |
| Melamine-formaldehyde precondensate solution according to | | | | |
| Example 1c (F:M = 1.65; 80% strength) [g] | — | — | — | 100 |
| Example 1d (F:M = 1.65; 70% strength) [g] | 60 | — | 100 | — |
| Example 2 (F:M = 1.55; 50% strength) [g] | — | 100 | — | — |
| Polyether-ol based on glycerol, propylene oxide and ethylene oxide; OH-number 35 [g] | — | 5 | — | — |
| Polyether-ol based on ethylenediamine and propylene oxide; OH-number 480 [g] | — | — | 5 | — |
| Triethanolamine [g] | 5 | 5 | 5 | 5 |
| Dibutyl-tin dilaurate [g] | — | — | — | 1 |
| Na $C_{15}$-paraffin sulfonate [g] | 3 | 3 | 3 | 3 |
| B-component according to | | | | |
| Example 10a [g] | 100 | — | — | — |
| Example 10b [g] | — | 100 | — | — |

TABLE III-continued

|  | Examples | | | |
| --- | --- | --- | --- | --- |
|  | 11 | 12 | 13 | 14 |
| Example 10c [g] | — | — | 100 | — |
| Example 10d [g] | — | — | — | 140 |
| Start time [sec] | 30 | 40 | 30 | 15 |
| Rise time [sec] | 120 | 115 | 110 | 90 |
| Tack-free time [sec] | 120 | 120 | 110 | 90 |
| Density [kg/m$^3$] | 18 | 28 | 30 | 14 |
| Fire resistance according to ASTM D 635-77 | self-extinguishing | | | |

We claim:

1. A process for the preparation of polyurethane foams by reacting organic polyisocyanates, polyols and melamine-formaldehyde precondensates in the presence of catalysts and blowing agents and in the presence or absence of chain extenders or crosslinking agents, auxiliaries and additives, wherein the melamine-formaldehyde precondensates used are aqueous resin solutions which have a melamine-formaldehyde precondensate content of 40–85% by weight, based on total weight, and which are obtained by condensing melamine with formaldehyde, in a molar ratio of 1:1.1–1.75, in aqueous solution, until the water-dilutability of the product, at 20° C., is 1:0.5–4.

2. The process of claim 1, wherein the melamine and formaldehyde are condensed at a pH which is, at least periodically, above 8, and at from 60° to 130° C.

3. The process of claim 1, wherein a stabilizer to improve the shelf line of the melamine-formaldehyde precondensate is added before, during or after the condensation of the melamine with the formaldehyde.

4. The process of claim 1, wherein the melamine:formaldehyde molar ratio is 1:1.5–1.65.

5. The process of claim 1, wherein the organic polyisocyanates used are aromatic polyisocyanates.

6. The process of claim 1, wherein the organic polyisocyanates used are prepolymers, containing isocyanate groups, which are obtained from polyols and aromatic polyisocyanates and having NCO contents of from 3 to 35% by weight.

7. The process of claim 5, wherein the aromatic polyisocyanates used are 2,4- and 2,6-toluylene diisocyanate or a corresponding isomer mixture, 2,2'-, 2,4'- and 4,4'-diphenylmethane diisocyanate or a corresponding isomer mixture, a mixture of 2,2'-, 2,4'- and 4,4'-diphenylmethane diisocyanate and polyphenyl-polymethylene polyisocyanates or a mixture of all the aromatic polyisocyanates mentioned.

8. The process of claim 1, wherein from 1 to 50 parts by weight of polyol are used per 100 parts by weight of the aqueous 40–85% strength by weight melamine-formaldehyde precondensate solution.

9. The process of claim 1, wherein water is used as the sole blowing agent.

10. The process of claim 1, wherein the starting materials are reacted by the two-component process, using a storage-stable A-component which contains melamine-formaldehyde precondensates, water, one or more basic polyurethane catalysts, if appropriate polyols, acid condensation catalysts, physical blowing agents, chain extenders or crosslinking agents, auxiliaries and additives and which has a pH of above 7, and a B-component which contains polyisocyanates or prepolymers containing isocyanate groups, if appropriate physical blowing agents, auxiliaries and additives.

* * * * *

UNITED STATES PATENT AND TRADEMARK OFFICE
CERTIFICATE OF CORRECTION

PATENT NO. : 4,367,294

DATED : January 4, 1983

INVENTOR(S) : Klaus Hahn, Peter Horn, Matthias Marx,
Heinz Weber, Wolfram Weiss and Rolf Wurmb It is certified that error appears in the above-identified patent and that said Letters Patent is hereby corrected as shown below:

Claim 3, second line, delete "line" and insert --life--.

Signed and Sealed this

Sixteenth Day of August 1983

[SEAL]

Attest:

GERALD J. MOSSINGHOFF

Attesting Officer — Commissioner of Patents and Trademarks